Sept. 28, 1937.  J. W. GREEN  2,094,533
METER PROTECTOR
Filed June 25, 1936
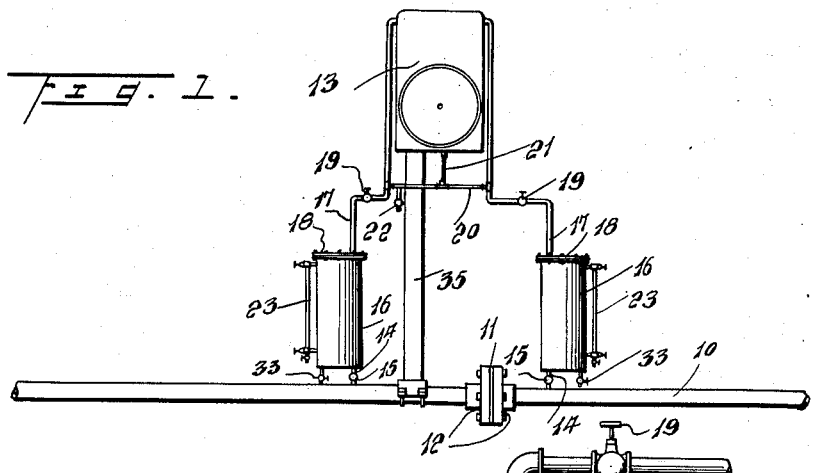
Inventor
John W. Green
By L. F. Kandrup, Jr.
Attorney Patented Sept. 28, 1937

2,094,533

UNITED STATES PATENT OFFICE 2,094,533

METER PROTECTOR

John W. Green, Longview, Tex.

Application June 25, 1936, Serial No. 87,322

3 Claims. (Cl. 73—205)

This invention relates to a protecting means for flow meters to be used on the pipes leading from flowing oil and gas wells, the meter being installed in communication with the gas line between the flow tank or separator and the casing head gasoline plant.

The present invention functions to prevent entrance of oil into the meter from either side of the orifice plate in the pipe line and to prevent the loss of mercury which may be blown from the meter by sudden change in the vacuum or pressure within the pipe line and meter.

The more specific objects and advantages will become apparent from a consideration of the description following taken in connection with accompanying drawing illustrating an operative embodiment.

In said drawing:—

Figure 1 is a view in elevation showing my improvements in connection with a fragment of a pipe line;

Figure 2 is an enlarged substantialy central, vertical sectional view through one of the protectors;

Figure 3 is a horizontal sectional view taken on the line 3—3 of Figure 2, and

Figure 4 is a vertical sectional view on an enlarged scale, particularly showing the liquid-operable float control valve mechanism.

Referring specifically to the drawing wherein like reference characters designate like or similar parts, 10 designates a flow pipe such as is used in the oil fields, through which the output of a flowing well passes, such pipe line having an orifice plate 11 therein fastened in place as usual by flanges 12.

A flow meter is shown at 13 which is for instance of the Westcott or Foxboro orifice meter type, and which thus uses mercury.

Said meter 13 is subject to the pressure within the pipe 10. To this end, vertical pipes 14, having cut-off valves 15 therein, rise from the pipe 10 and into cylinders or chambers 16. Outlet pipes 17 lead from the cover 18 of the chambers, which covers are sealed gas tight to the cylinders. Pipes 17 have cut-off valves 19 therein and they lead to the meter 13, such pipes 17 preferably being connected by a cross pipe at 20 having a branch 21 in communication with the meter and also having a drain valve 22 connected therein.

Each chamber 16 has a suitable sight gauge 23 connected therein as shown.

At the lower ends of the pipes 17, brackets 24 are suitably mounted and slidably supported thereby in openings 25, are needle valves 26, the latter having flanges 27 adapted to rest on the brackets. The lower ends of the pipes have orifices 28 therethrough from which the needle valves 26 are normally spaced. Suitable floats 29 which may be of cork or any other buoyant material, are carried by arms 30, pivoted as at 31 to the outlet pipes 17.

In the operation of the structure, gas and liquid pass through the pipe 10 as the well flows, a portion thereof entering the casings or cylinders 16 through the pipes 14, first striking inclined baffles 32 therein, the liquid settling in such tanks and the gas passing through the orifices 28 into the pipes 17 and thence to the meter 13.

At the same time, sudden changes in the vacuum or pressure conditions in the apparatus will cause the loss or outlet of mercury from the meter 13 through the pipes 17 into the cylinders or casings 16. The mercury and oil or other liquids will accumulate in the casings or cylinders 16, the mercury falling to the bottom and the pipes 14 being sufficiently high therein to prevent the outlet of the mercury from the tanks or cylinders 16. The oil or other liquid above the mercury, when it rises sufficiently, will be engaged by the cork 29, gradually raising the same and the latter in its movement strikes the valves 26, moving them against their seats 28, thus cutting off the outlet of any material through the pipes 17. The mercury and accumulated materials within the cylinder 16 may be drained off under control of suitable valves at 33.

Within the cylinders, sponges 34 may be suitably secured as shown to prevent rust, trash or other foreign matter from entering the cylinders and interfering with the valve seats at the orifices 28.

Preferably two of the cylinders and associated parts are employed as shown, to prevent the oil entering or interfering with the operation of the meter from either side of the orifice plates 11 and the flanges 12.

A suitable support or bracket 35 for the meter 13, is clamped to the pipe 10 as shown.

For the purpose of illustration of an application of the invention, an orifice meter and its adjuncts have been shown and described, but obviously the filter is applicable to any type of indicating or recording device on a pipe line through which gas, air or vapors are flowing, in combination with liquids, and depending on a differential in pressure for its indication or record of such differential, and the invention is, therefore, not limited to the application of the device as shown and described except where specifically limited hereinafter, and also that various changes may be resorted to provided they fall within the spirit and scope of the invention.

I claim as my invention:—

1. In combination with a pipe line for flowing material, a flow meter, a cylinder, an outlet pipe leading from the interior of the cylinder to said meter, an inlet pipe leading from the pipe line to a point in said cylinder above the base of the cylinder, and means operable by liquids within the cylinder to close the inlet to the outlet pipe, comprising a normally opened valve, and float means operable to close said valve.

2. In combination with a pipe line for flowing material, having a restriction therein, cylinders, pipes leading from the pipe line on opposite sides of said restriction to the cylinders and terminating in said cylinders above the bases of said cylinders, outlet pipes leading from the cylinders, a flow meter to which said last mentioned pipes are operatively connected, and means in each cylinder operable automatically through the rise of liquid therein to close the inlet to said outlet pipes, comprising orifices in the lower end of said outlet pipes, brackets on said pipes, needle valves mounted by said brackets and normally spaced from the orifices, and float means connected to the outlet pipes and operable by the rise of liquid within the cylinders to elevate the floats and move the needle valves to closed positions.

3. In combination with a pipe line for flowing material, having a restriction therein, cylinders, pipes leading from the pipe line on opposite sides of said restriction to the cylinders and terminating in said cylinders above the bases of said cylinders, outlet pipes leading from the cylinders, a flow meter to which said last mentioned pipes are operatively connected, and means in each cylinder operable automatically through the rise of liquid therein to close the inlet to said outlet pipes, comprising orifices in the lower end of said outlet pipes, brackets on said pipes, needle valves mounted by said brackets and normally spaced from the orifices, and float means connected to the outlet pipes and operable by the rise of liquid within the cylinders to elevate the floats and move the needle valves to closed positions, baffles within the cylinders adjacent the upper ends of the first mentioned pipes, the elevation of said first mentioned pipes above the bases of the cylinders providing space for the accumulation of mercury which may escape from the flow meter, and drain means for the mercury from the cylinders.

JOHN W. GREEN.